(12) United States Patent
Metcalfe et al.

(10) Patent No.: US 8,004,714 B2
(45) Date of Patent: Aug. 23, 2011

(54) SYSTEM FOR REPLACING A PORTION OF AN IMAGE DATA STREAM IN AN INK JET PRINTER

(75) Inventors: David J. Metcalfe, Marion, NY (US);
Mark R. Parker, Portland, OR (US);
Theresa M. Marconi, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1162 days.

(21) Appl. No.: 11/787,668

(22) Filed: Apr. 17, 2007

(65) Prior Publication Data
US 2008/0260263 A1 Oct. 23, 2008

(51) Int. Cl.
*G06F 15/00* (2006.01)
*G06K 9/62* (2006.01)

(52) U.S. Cl. .................. 358/1.18; 382/209

(58) Field of Classification Search .......... 358/1.18, 358/1.15, 1.9, 2.1, 3.2, 3.26, 515, 3.06, 462, 358/448, 447, 1.11, 534, 1.1; 382/269, 209, 382/217, 232, 166, 254; 379/32.04, 7, 35
See application file for complete search history.

(56) References Cited

U.S. PATENT DOCUMENTS

| | | | |
|---|---|---|---|
| 5,005,139 A * | 4/1991 | Tung | 358/1.1 |
| 5,483,355 A | 1/1996 | Overton | |
| 5,675,365 A | 10/1997 | Becerra et al. | |
| 6,987,588 B2 | 1/2006 | Yao et al. | |

* cited by examiner

*Primary Examiner* — Saeid Ebrahimi Dehkordy
(74) *Attorney, Agent, or Firm* — Maginot, Moore & Beck LLP

(57) ABSTRACT

A system detects image data in an image data stream that cause ink ejection errors and replaces the image data with a replacement pattern that attenuates the ink ejection errors. The system includes a scanline memory for storing image data, an input data register for forming an image data pattern from image data read from the scanline memory and an image bit received from an image data stream, an image data pattern detection circuit having a comparator that is configured to compare a portion of an image data bit stream used to drive a print head in an ink jet printer to a plurality of detection bit patterns and to generate a bit pattern detection signal in response to the portion of the image data bit pattern corresponding to one of the detection bit patterns, a replacement bit pattern circuit being configured to replace the portion of the image data bit stream corresponding to one of the detection bit patterns with a replacement bit pattern, the replacement bit pattern being different than the detected bit pattern, a tag register coupled to the image data pattern detection circuit and being configured to modify the comparison of the portion of the image data bit stream to one of the detection bit patterns, and an output data register for providing a replacement image bit from the replacement bit pattern to a print head controller and for storing a remainder of the replacement bit pattern to the scanline memory.

17 Claims, 9 Drawing Sheets

SYSTEM FOR REPLACING A PORTION OF AN IMAGE DATA STREAM IN AN INK JET PRINTER

TECHNICAL FIELD

This disclosure relates generally to ink jet printers, and, more particularly, to controllers for print heads used in ink jet printers.

BACKGROUND

Ink jet printers have print heads that operate a plurality of ejection jets from which liquid ink is expelled. The ink may be stored in reservoirs located within cartridges installed in the printer, or the ink may be provided in a solid form and then melted to generate liquid ink for printing. In these solid ink printers, the solid ink may be in either pellets or ink sticks. The solid ink pellets or ink sticks are typically placed in an "ink loader" that is adjacent to a feed chute or channel. A feed mechanism moves the solid ink sticks from the ink loader into the feed channel and then urges the ink sticks through the feed channel to a heater assembly where the ink is melted. In some solid ink printers, gravity pulls solid ink sticks through the feed channel to the heater assembly. Typically, a heater plate ("melt plate") in the heater assembly melts the solid ink impinging on it into a liquid that is delivered to a print head for jetting onto a recording medium. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al., the disclosures of which are incorporated herein by reference, describe exemplary systems for using solid ink sticks in an ink jet printer.

In ink jet printers, the liquid ink is expelled from print head orifices across an open gap to a receiving member to form an image. The receiving member may be media or it may be a revolving print drum or other intermediate offset member. In the print head, individual piezoelectric actuators generate mechanical forces that expel ink through an orifice from an ink filled conduit in response to an electrical voltage signal, sometimes called a driving signal. The driving signal is generated by a print head controller in accordance with image data. These image data are pixels that correspond to digitized data of scanned or other electronic documents. For monochrome images, the pixels all correspond to black ink. For color images, the pixels correspond to one of the component ink colors used to form hues in the printed image. The component colors may be cyan, magenta, yellow, and black, for example, and an ejection jet is provided for each color to eject ink droplets of one particular color only. The amplitude of the signals affect the amount of ink ejected.

As already noted, the pixels are provided to a print head controller for generation of a driving signal. The piezoelectric actuators in a print head are typically arranged in rows and columns. The signals generated by the print head controller are coordinated with the rotation of the receiving member or the passing media so the ink droplets ejected from a print head form characters and image components across the width of the receiving member and along the length of the receiving member. Theoretically, an actuating pulse of a driving signal causes an actuator to expel an appropriate amount of ink towards the receiving member at a particular velocity. If this description was always accurate, placement of the ink drops on the receiving member would be predictable. Unfortunately, a number of physical properties of print head actuators as well as other characteristics of the print head and the receiving member affect the generation of the ink drops and their reception on the receiving member.

One of the issues affecting ink droplet placement arises from the arrangement of the ink droplets corresponding to the pixel data. Specifically, the pattern of ink droplets produced by a particular actuator may alter the performance of the actuator. As shown in FIG. 1A, a receiving member rotates towards the bottom of the page so a vertical column of dots is upwardly generated as the actuator selectively ejects ink. In the figure, a sequence of expected dots 10 is depicted as being blank, blank, ink dot, ink dot, ink dot, blank, blank, blank, ink dot, blank, and blank. This sequence may be represented numerically with the sequence 00111000100. When the driving signal for generating this dot sequence is applied to the actuator, the ink droplet following the three blank dots is displaced. This displacement occurs because the actuator, in response to the signal for generating a single drop after three inactive pulses, ejects an ink droplet having a velocity that is less than the velocity of an ink droplet normally produced by the actuator. Consequently, the receiving member has more time to move before the ink droplet reaches the member. Thus, the ink droplet lands on the receiving member at a position that is further upstream than predicted for the drop. The resulting pattern 14 is shown in FIG. 1A for comparison purposes. Similar phenomena have been observed for particular dot patterns. The three off, one on pattern is one of a number of observed dot patterns that cause an actuator to eject an ink droplet with different properties than normally expected from the actuator. The resulting dot pattern is, therefore, different than the expected dot pattern. These observed differences between the expected image pattern and the pattern actually printed demonstrate that electromechanical eccentricities or characteristics of print head actuators may result in the erroneous printing of image data.

While the one dot displacement may appear to be insignificant, it can lead to jagged edges at the boundaries of characters and image components. These jagged edges may interfere with the aesthetical presentation of characters or images on a document. In some cases, the deviations may affect the accuracy of an optical character reader. Attenuating these observed printing anomalies caused by the response of ink jet actuators to particular dot patterns would be useful for ink jet printers.

SUMMARY

A system that detects and corrects problematic dot patterns helps reduce the number of dot displacements that may be produced by a print head in a printer. The system includes an image data pattern detection circuit having a comparator that is configured to compare a portion of an image data bit stream used to drive a print head in an ink jet printer to a plurality of detection bit patterns and to generate a bit pattern detection signal in response to the portion of the image data bit stream corresponding to one of the detection bit patterns, a replacement bit pattern circuit being configured to generate a replacement bit pattern for replacing the portion of the image data bit stream corresponding to one of the detection bit patterns with the replacement bit pattern, the replacement bit pattern being different than the detected bit pattern, and a tag register coupled to the image data pattern detection circuit and being configured to modify the comparison of the portion of the image data bit stream to one of the detection bit patterns.

The system implements a method for correcting image data in an image data stream. The method includes comparing a detection bit pattern to a portion of an image data bit stream used to drive a print head in an ink jet printer, generating a bit pattern detection signal in response to the portion of the image data bit stream corresponding to the detection bit pattern, replacing the portion of the image data bit stream that corresponds to the detection bit pattern with a replacement bit pattern, the replacement bit pattern being different than the detected bit pattern, and selectively modifying the detection bit pattern before comparing the detection bit pattern to the portion of the image data bit stream.

In one particular embodiment, the system that replaces image data in a stream of image data includes a scanline memory for storing image data, an input data register for forming an image data pattern from image data read from the scanline memory and an image bit received from an image data stream, an image data pattern detection circuit having a comparator that is configured to compare a portion of an image data bit stream used to drive a print head in an ink jet printer to a plurality of detection bit patterns and to generate a bit pattern detection signal in response to the portion of the image data bit pattern corresponding to one of the detection bit patterns, a replacement bit pattern circuit being configured to replace the portion of the image data bit stream corresponding to one of the detection bit patterns with a replacement bit pattern, the replacement bit pattern being different than the detected bit pattern, a tag register coupled to the image data pattern detection circuit and being configured to modify the comparison of the portion of the image data bit stream to one of the detection bit patterns, and an output data register for providing a replacement image bit from the replacement bit pattern to a print head controller and for storing a remainder of the replacement bit pattern to the scanline memory.

DETAILED DESCRIPTION

Figure 1A:
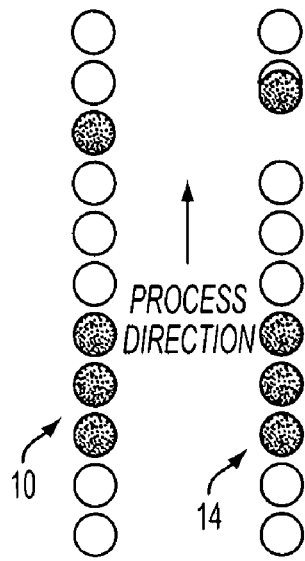
FIG. 1A is a perspective view of a desired dot pattern and the resulting dot pattern generated by a print head jet in an ink printer.

Like reference numerals refer to like parts throughout the following description and the accompanying drawings.

Figure 1B:
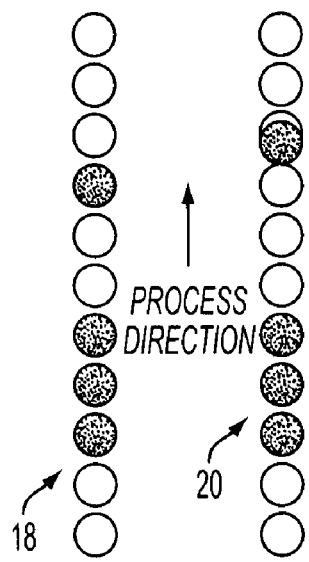
FIG. 1B is a perspective view of a substitution dot pattern for the desired dot pattern of FIG. 1A and the resulting dot pattern that attenuates the displacement of the errant ink droplet shown in FIG. 1A.

As noted above, one of the issues affecting ink droplet placement arises from the arrangement of the ink droplets corresponding to the pixel data. The pattern of ink droplets produced by an ink jet, such as the pattern 10 shown in FIG. 1A, may not accurately represent the image bit data 14 used to generate the driving signal for the ink jet. To compensate for this inaccuracy, a replacement bit pattern may be substituted for the image data 10. In FIG. 1B, a replacement bit pattern 18 is shown with the resulting actual printed ink dot sequence 20. As depicted in the figure, the replacement bit pattern has an ink dot only two bits after the last ink dot, instead of three dots as shown in the image data 10 of FIG. 1A. By moving the ink dot up one position in the image data, the ink jet is able to respond with an ejection of ink that falls approximately three positions after the last ink dot ejection. The resulting printed pattern 20 more accurately represents the original image data 10 than the printed pattern 14. Therefore, substituting a replacement bit pattern 00111001000 for the original image data pattern 00111000100 enables a more accurate ink dot pattern to be produced by the ink jet. These phenomena have been observed for a number of image data patterns.

Figure 2:
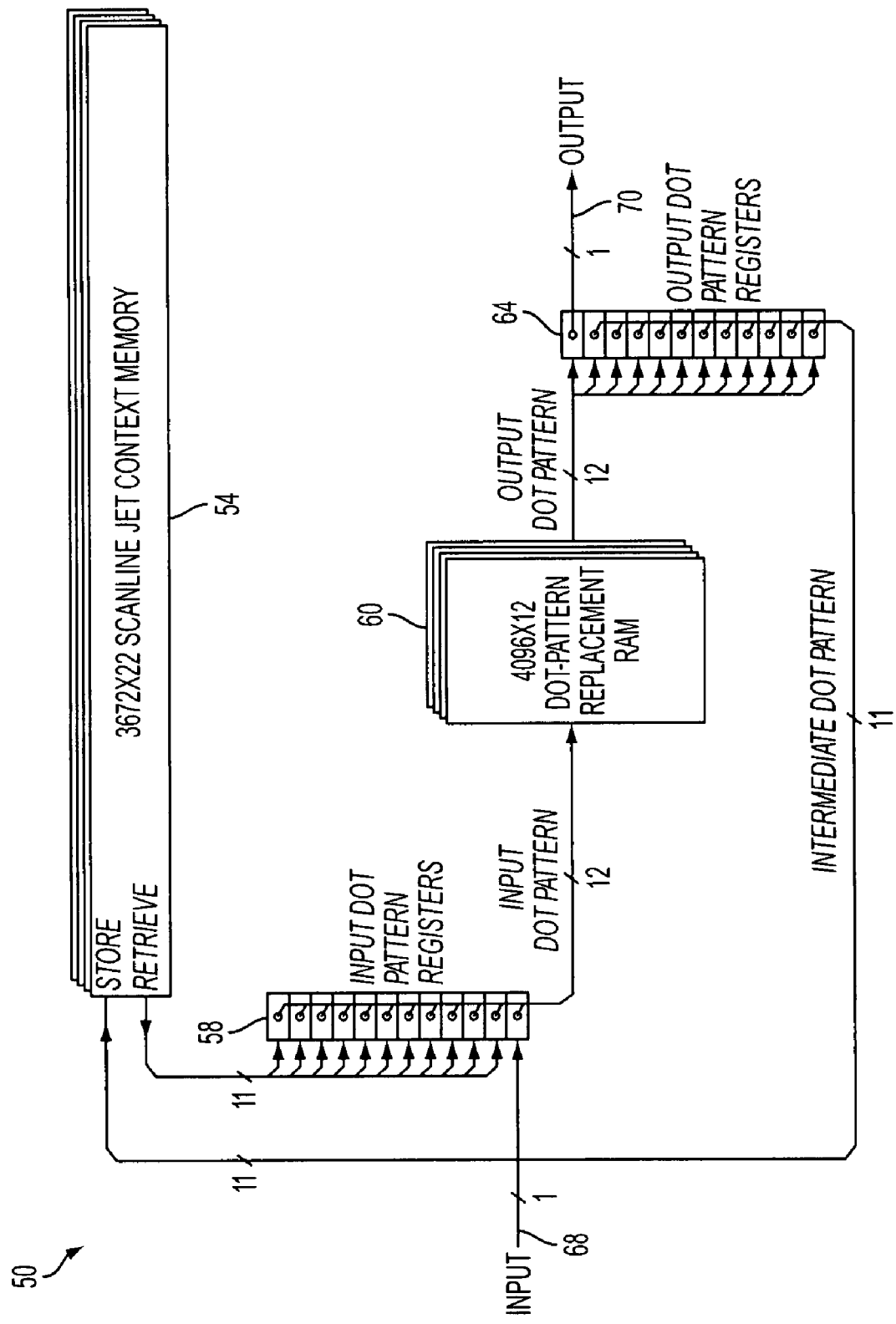
FIG. 2 is a block diagram of an exemplary system that detects problematic image data patterns and generates a replacement bit pattern that attenuates ink droplet displacement caused by the problematic image data pattern.

A system has been developed that detects image data patterns in a stream of image data that cause inaccurate ink dot patterns to be printed. The system also substitutes the detected image data pattern with a replacement bit pattern that attenuates the error produced by the detected image data. One embodiment of the system is shown in FIG. 2. The system 50 includes a scanline memory 54, a twelve bit input data register 58, a 4096×12 bit ROM 60, and a twelve bit output register 64. The input register 58 is coupled to the scanline memory 54, an input data bit line 68, and the replacement ROM 60. The next image data bit is provided on the input data line 68 so it becomes the least significant bit in the data register. The most significant eleven bits are provided from the scanline memory. The scanline memory 54 stores image data that is displayed on a screen. As the next image bit in the stream of image data is received, it is appended to the image data bit pattern retrieved from the scanline memory and used as an address to strobe the replacement ROM 60.

The replacement ROM 60 operates as a lookup table. That is, an image data pattern is used as an address and the data content of the address is the image data pattern that should be used for driving an ink jet. Specifically, the ROM 60 stores replacement bit patterns. For addresses that do not cause print ink jet problems to occur, the data stored at the location are the same as the address. Thus, the data output by the ROM 60 are the same as the data word received from the input data register. The data word output by the ROM 60 is provided to the output data register 64. The most significant bit of the output data register is then provided to the output data bit line 70, which is coupled to the print head controller for generation of the ink jet driving signal. The remaining eleven bits are stored in the scanline memory. For bit patterns that do not cause ink jet problems, the data stored in a scanline memory location cycles through until the least significant bit becomes the most significant bit and is output to the print head controller.

For image data patterns that cause ink jet problems, the storage location in the replacement ROM 60 having an address that corresponds to the problematic image data pattern contains a replacement bit pattern. This replacement bit pattern attenuates the printing error caused by the problematic image data pattern. Specifically, the replacement bit pattern is a data image pattern that is more accurately printed by the ink jet actuator by avoiding the eccentric response of the actuator to the problematic image pattern. Although the accurate reproduction of the replacement value does not result in the generation of the problematic image pattern, it does produce a dot pattern that attenuates the observable deficiencies of the actuator's response to the problematic data pattern. Therefore, even though the reproduction of the replacement data pattern does not result in an accurate reproduction of the problematic data pattern, it does produce an inaccurate dot pattern that is less noticeable.

When the replacement bit pattern is provided to the output register 70, the most significant bit is output to the print head and the remaining eleven bits are output to the scanline memory for storage. In this manner, a replacement bit pattern has been substituted for the problematic image data pattern. Because the replacement ROM 60 substitutes a replacement bit pattern for a problematic image data pattern, it acts as an image data pattern detection circuit and as a replacement bit pattern circuit. As used herein, the word "circuit" refers to a configuration of hardware components, a configuration of software components, or a combination of hardware and software, that cooperate to provide a function or perform a task.

As noted above, not all of the addresses in the address space of the replacement ROM 60 are problematic image data patterns. Consequently, these addresses contain the address of the location as the data value. Additionally, "don't care" states that represent non-problematic combinations in a twelve bit image data word that also contain a problematic image data pattern in another portion of the data word fill a lot of the memory space with redundant data. Consequently, the memory cost for an implementation using a memory lookup table, such as the one shown in FIG. 2, is relatively expensive.

To address the issues arising from the use of a memory lookup table, an image data detection/replacement circuit has been developed that reduces the redundant image data storage issue. Such a system is shown in FIG. 3A to FIG. 3F. The system 100 includes scanline memory 104, a pair of input data registers 106, 108 coupled to an input pattern multiplexer 112, an image data detection circuit 110, a priority encoder 118, a pair of multiplexers 124, 128, a replacement bit pattern register 120, and an output data register 130.

Figure 3A:
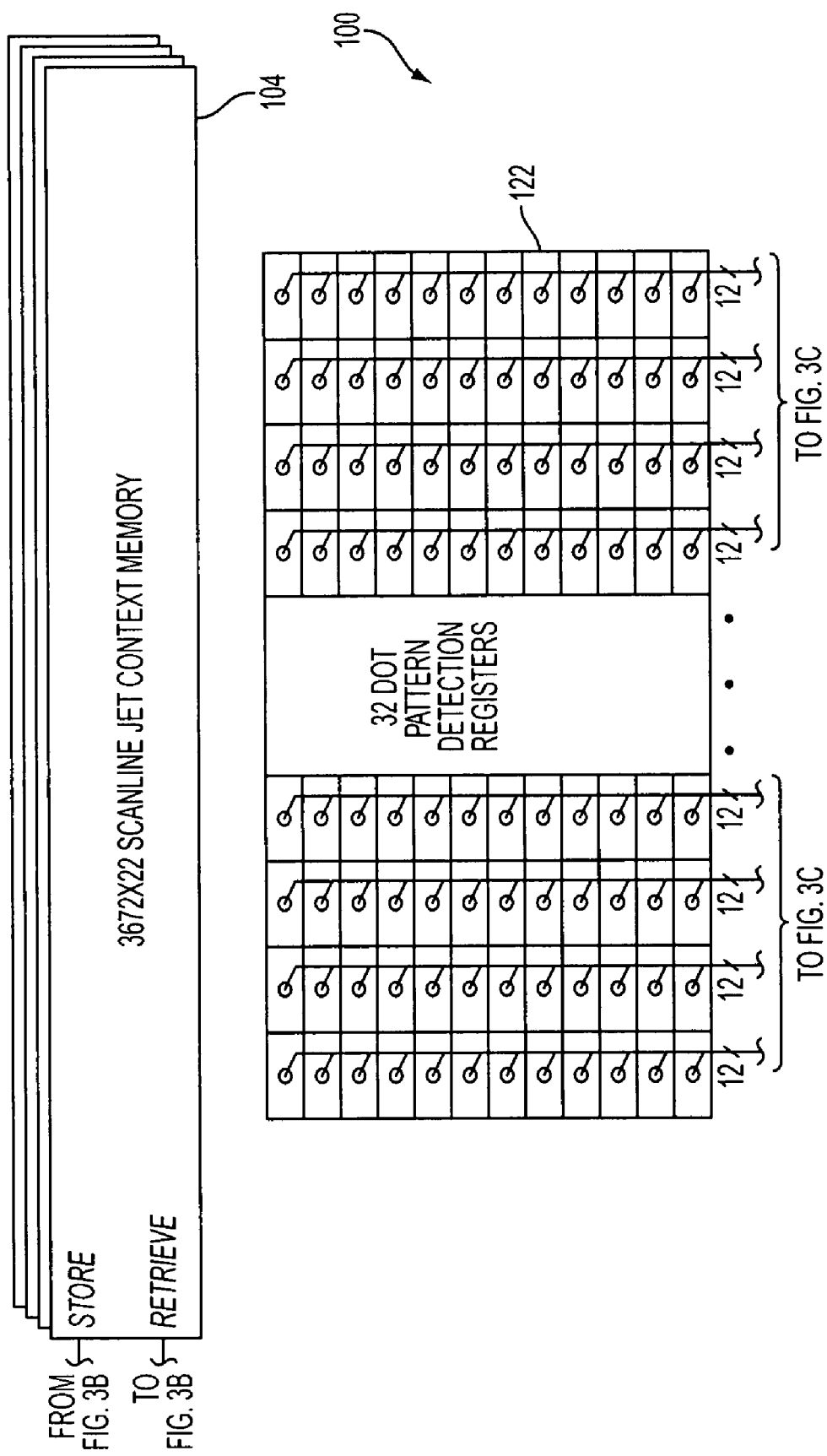
FIG. 3A, FIG. 3B, FIG. 3C, FIG. 3D, FIG. 3E, and FIG. 3F form a block diagram of an exemplary system that detects problematic image data patterns and generates a replacement bit pattern that attenuates ink droplet displacement caused by the problematic image data pattern and that also implements a priority scheme for arbitrating the detection of multiple problematic image data patterns.
Figure 3B:
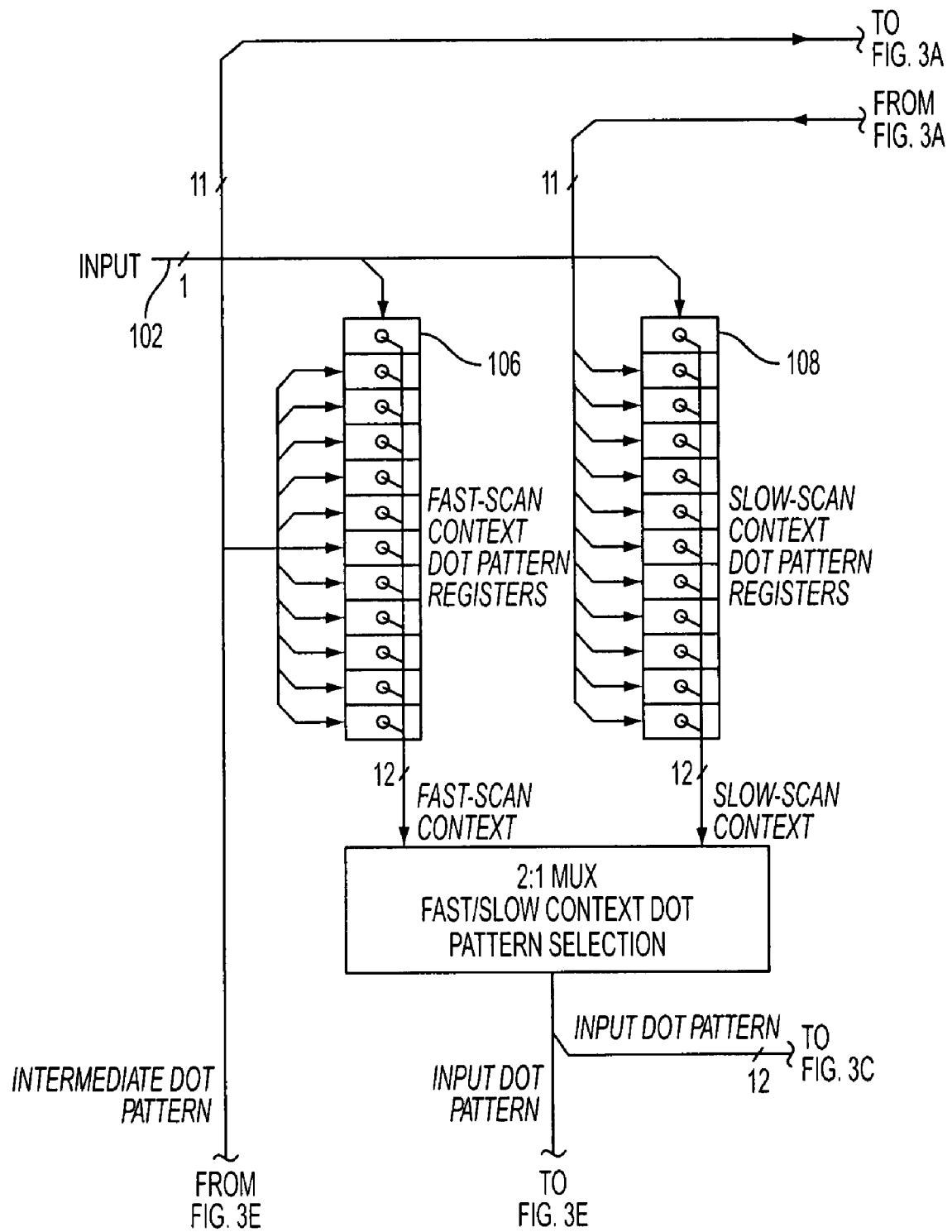
Figure 3C:
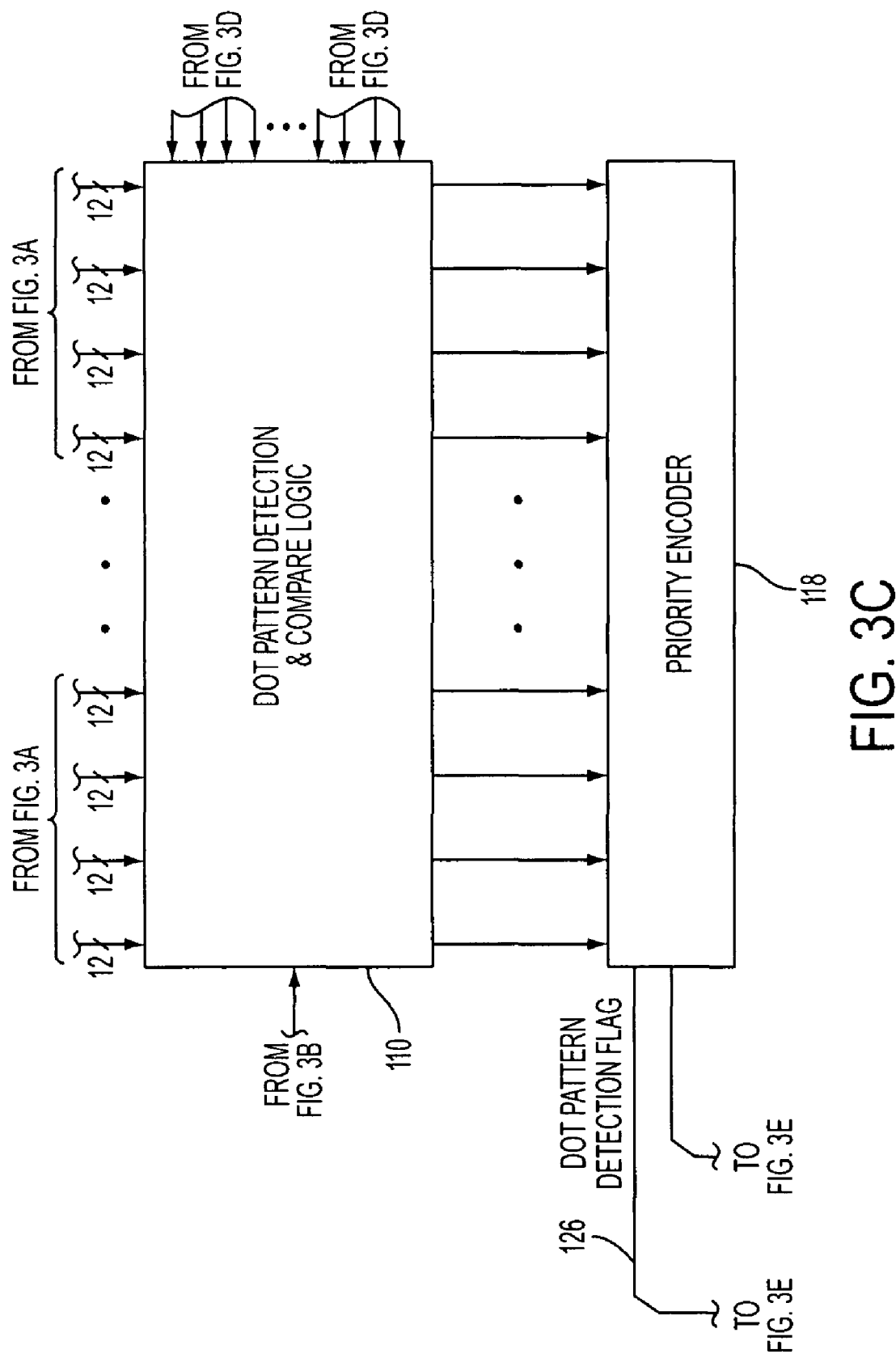
Figure 3D:
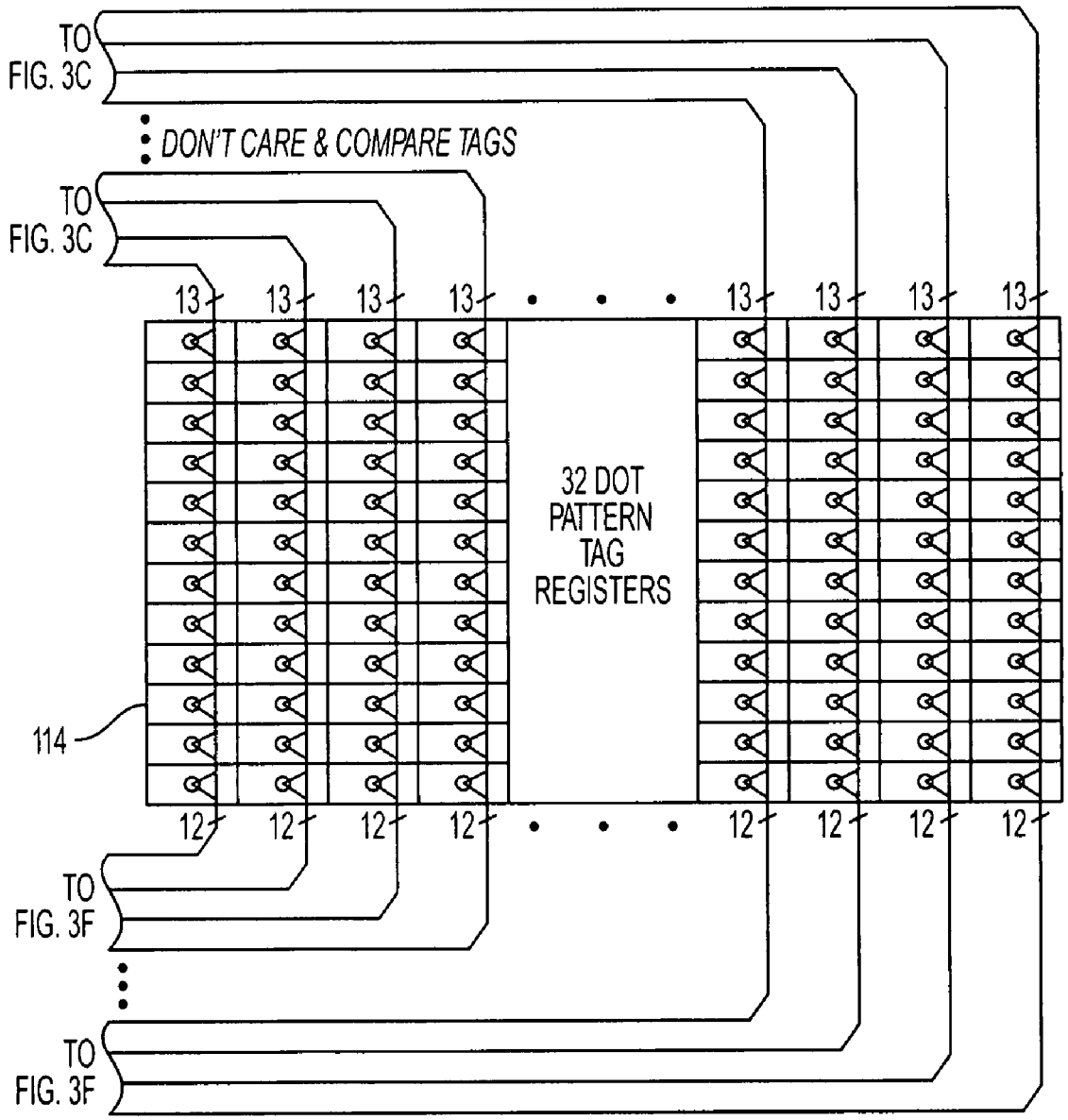
Figure 3E:
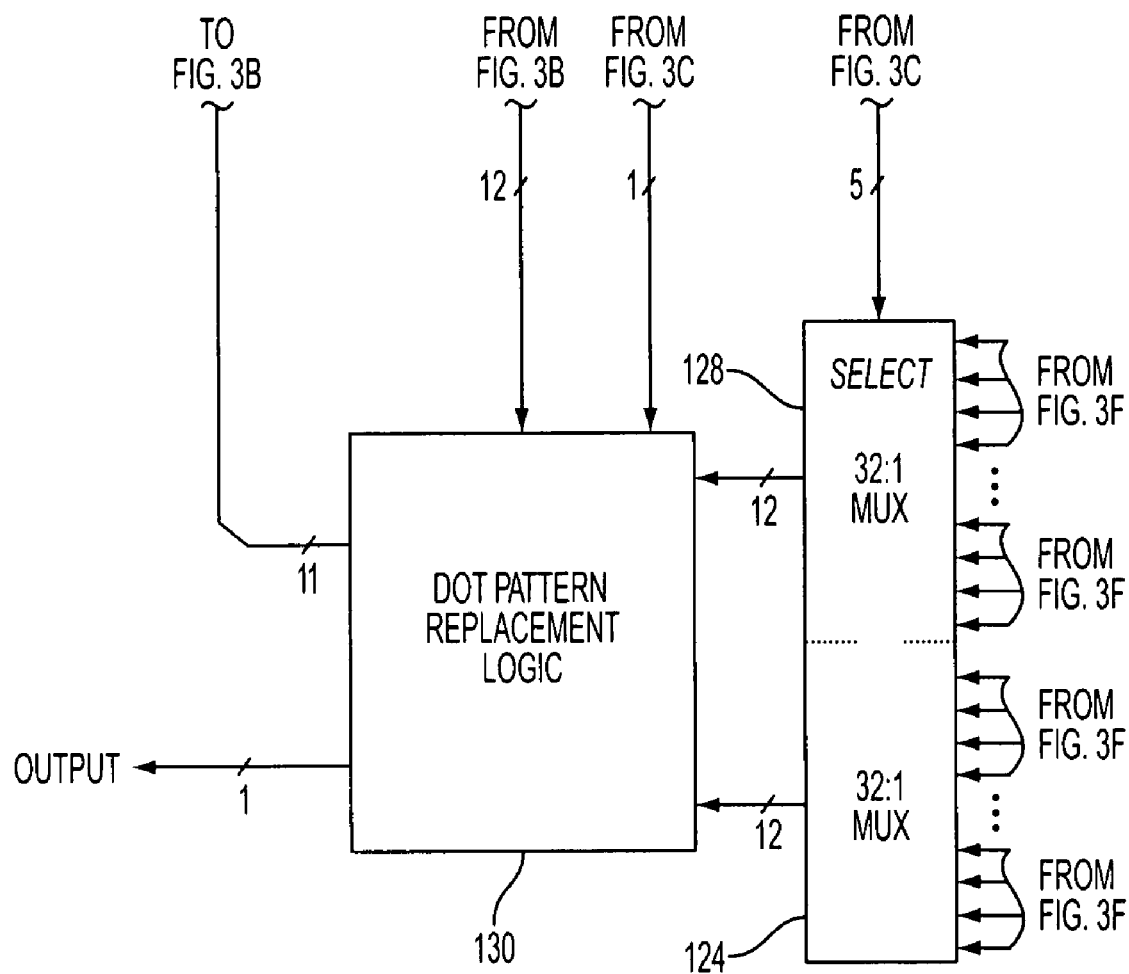
Figure 3F:
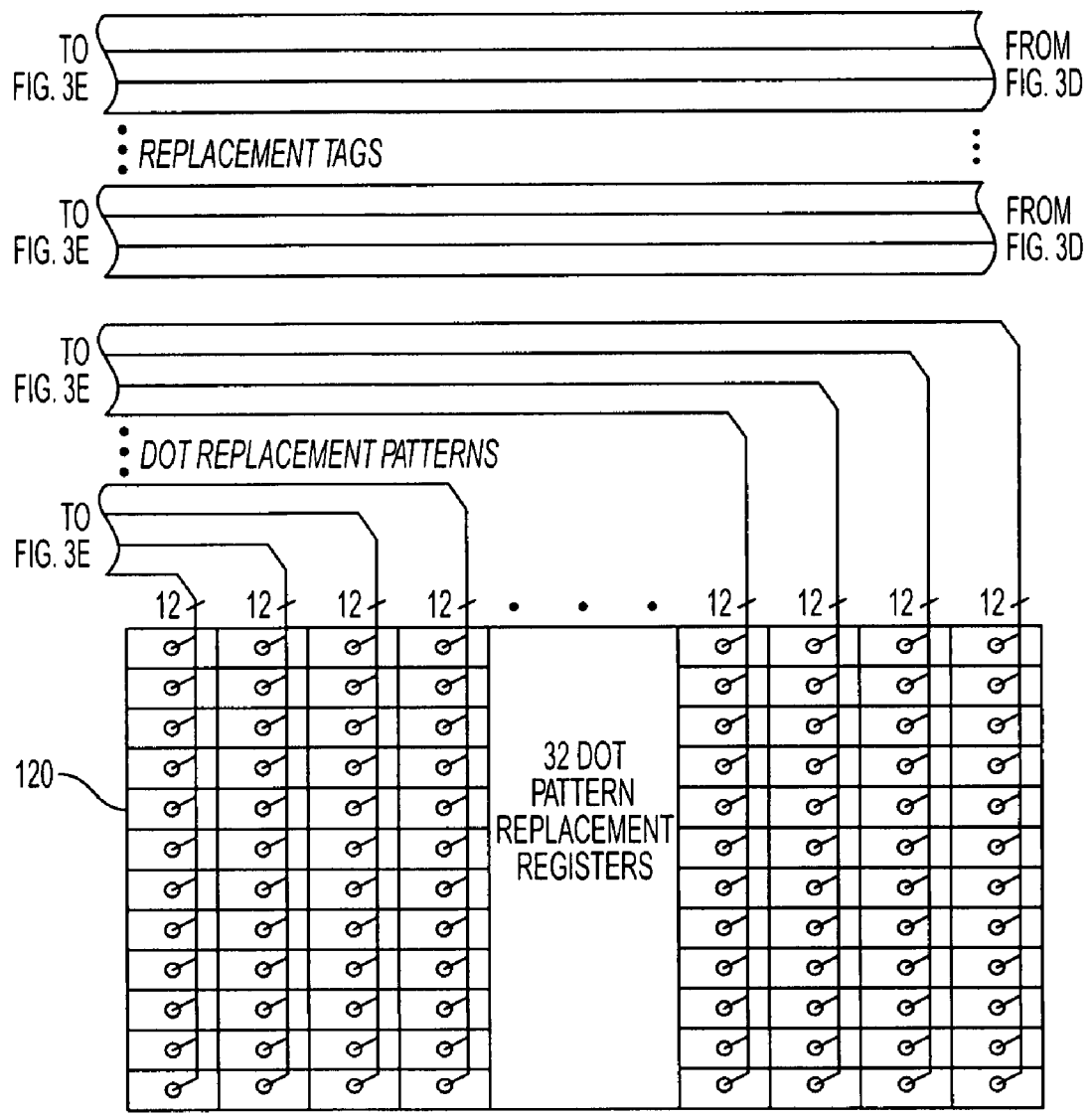

The system 100 is configured to receive image data from a rotated or a non-rotated image data generator. These modes of data generation are also known as fast scan and slow scan methods, respectively. For fast scan image data, the memory 104 is not required as the neighboring data values are readily available. As shown in FIG. 3B, the latest eleven bits processed are shifted in position by one bit and returned to the fast scan data register 106. The new input image data bit is received on input line 102 and placed in the least significant bit position of the register 106. A control signal (not shown) is input to the fast/slow scan multiplexer 112 to select the data from one of the registers 106 or 108. If the control signal indicates the fast scan mode is active, then the multiplexer 112 selects the image data formed by the fast scan register 106 and inputs the data to the image data detection circuit 110 for processing.

When the control signal indicates the slow scan mode is active, the multiplexer 112 provides data from the slow scan input register 108 to the image data detection circuit 110 for processing. The input register 108 is coupled to the memory 104 to receive the neighboring data in the slow scan direction. The next bit of image data is received on input line 102 and provided to the least significant bit position of the slow scan register 108 to form the image data pattern. The image data pattern from the register 108 is provided to the image data detection circuit 110 through the fast/slow scan multiplexer 112 responding to the control signal indicating the slow scan mode is active.

The image data pattern detection circuit 110 is coupled to a detection pattern register 122 and a tag register 114. The detection pattern register 122 includes one or more memory locations, each of which contains a problematic image data pattern. In one embodiment, the detection pattern register 122 contains thirty-two data words, each word being twelve bits long. Of course, fewer or more detection bit patterns of other bit lengths may also be incorporated without departing from the principles being described with reference to the system 100. In one embodiment, the detection circuit includes a plurality of comparators for comparing the image data word to each of the detection bit patterns. In response to a comparator detecting a detection bit pattern in an image data word, the comparator generates a bit pattern detection signal. In another embodiment, a single comparator may be used to compare the image data pattern to multiple detection patterns in a serial fashion. The bit pattern detection signals generated by one or more comparators in the detection circuit 110 are provided to the priority encoder 118 for further processing.

In another embodiment, the detection circuitry 110 also receives don't care words from the tag register 114. These don't care words are logically incorporated into the image data word or the detection bit pattern so the comparison operations only evaluate the bit positions of the image data word that correspond to the bits in the detection pattern that cause an ink jet anomaly. Thus, the tag register 114 operates as a comparison modification circuit to modify the comparison operations performed by the detection circuit 110. In one embodiment, the tag register 114 includes thirty-two locations for storing twelve bit don't care words. Again, fewer or more locations may be used in other embodiments of the tag register and the locations may store words having fewer or more bits than twelve. In another embodiment, each of the locations in the tag register 114 also includes one additional bit for a comparison control bit. The comparison control bit is used by a comparison control circuit in the detection circuit 110 to disable a corresponding comparator for detecting a particular detection pattern in response to a comparison control bit being active. Thus, the comparison control bit inhibits a comparison operation and reduces the power consumed by the detection circuit. Accordingly, an embodiment of the tag register 114 that includes a comparison control bit for each don't care word results in a more energy efficient detection circuit. For comparison operations that compare an image data pattern to a detection pattern and a don't care word, the comparators also generate a bit pattern detection signal in response to the bits of the image data pattern that are not in the don't care bit position corresponding to the detection pattern. Again, the bit pattern detection signals are provided to the priority encoder 118.

Priority encoder 118 propagates the highest priority bit pattern detection signal received from the detection circuit 110 that was active. In an embodiment having thirty-two comparators for comparing the image data word to thirty-two detection patterns and thirty-two don't care words, such as the one shown in FIG. 3, up to thirty-two active bit pattern detection signals may be received by the priority encoder 118. In this embodiment, the logic implemented by the priority encoder 118 generates a five bit data word having a binary value that corresponds to the highest priority detection pattern detected by the detection circuit 110. The priority encoder enables the detection patterns to be prioritized in a manner so detection patterns that result in more noticeable printing anomalies are replaced before those patterns that result in less noticeable printing anomalies are replaced. Additionally, the priority encoder 118 and the don't care words stored in the tag register 114 enable the system 100 to detect all occurrences of a problematic image data pattern without requiring the system to store redundant data.

The priority encoder 118 also generates a dot pattern detection flag 126. This flag indicates whether any of the patterns evaluated by the pattern detection circuit 110 were detected. If a pattern is detected, the flag is set to an active value so the dot pattern replacement circuit 130 is enabled to receive replacement data from the two multiplexers 124, 128 coupled to it. If no patterns were detected in the image data, then the dot pattern detection flag is set to an inactive value. In response to the inactive value, the dot pattern replacement circuit 130 receives the image data from the fast/slow scan multiplexer 112 and does not perform any replacement data operations on it. Thus, the dot pattern detection flag indicates whether a pattern was detected independently from the identification data used to identify a detected pattern. Consequently, one of the pattern identification words generated by the priority encoder 118 is not required to indicate a pattern was not detected.

The priority encoder pattern identification output is coupled to the multiplexers 124 and 128. The inputs of the multiplexer 128 are coupled to the tag register 114 to receive the bits of the don't care word that were used to compare the image data pattern to the detection pattern in detection circuit 110. This don't care word is passed through the mutliplexer 128 to the output circuit 130. In a similar manner, the priority encoder value causes multiplexer 124 to select the replacement bit pattern from the replacement register 120 that corresponds to the highest priority detection pattern that was detected. In one embodiment, the replacement register 120 contains thirty-two locations having twelve bit replacement bit patterns, but other numbers of locations and other replacement bit pattern sizes may be used. The replacement bit patterns correspond to the detection patterns and are comprised of a bit string that attenuates the ink jet anomaly associated with the detection pattern. The replacement bit pattern is passed through the mutliplexer 124 to the output circuit 130.

In the replacement circuit 130, the original data word from multiplexer 112, the don't care word from multiplexer 128, and the replacement bit pattern from multiplexer 124 are logically incorporated with one another, if a detection pattern occurred in the image data word. The resulting pattern is the output image word. If no detection patterns were detected, then the replacement circuit 130 responds to the inactive state of the dot pattern detection flag by routing the image data received from the multiplexer 112 to the output line and intermediate dot pattern outputs without modification. If a detection pattern was detected, the image data is modified using the don't care word and the replacement bit pattern. The don't care word ensures that the data bits in the image data word that do not cause an ink jet anomaly to remain as they were in the image data. The bits that do contribute to the production of the printing anomaly, however, are changed by the replacement bit pattern. The most significant bit of the output image data word is provided to a print head on output line 134. The remaining least significant bits are routed to the scanline memory 104 for storage, if the slow scan mode is active, or to the most significant bit positions of the fast scan register 106, if the fast scan mode is active.

Figure 4:
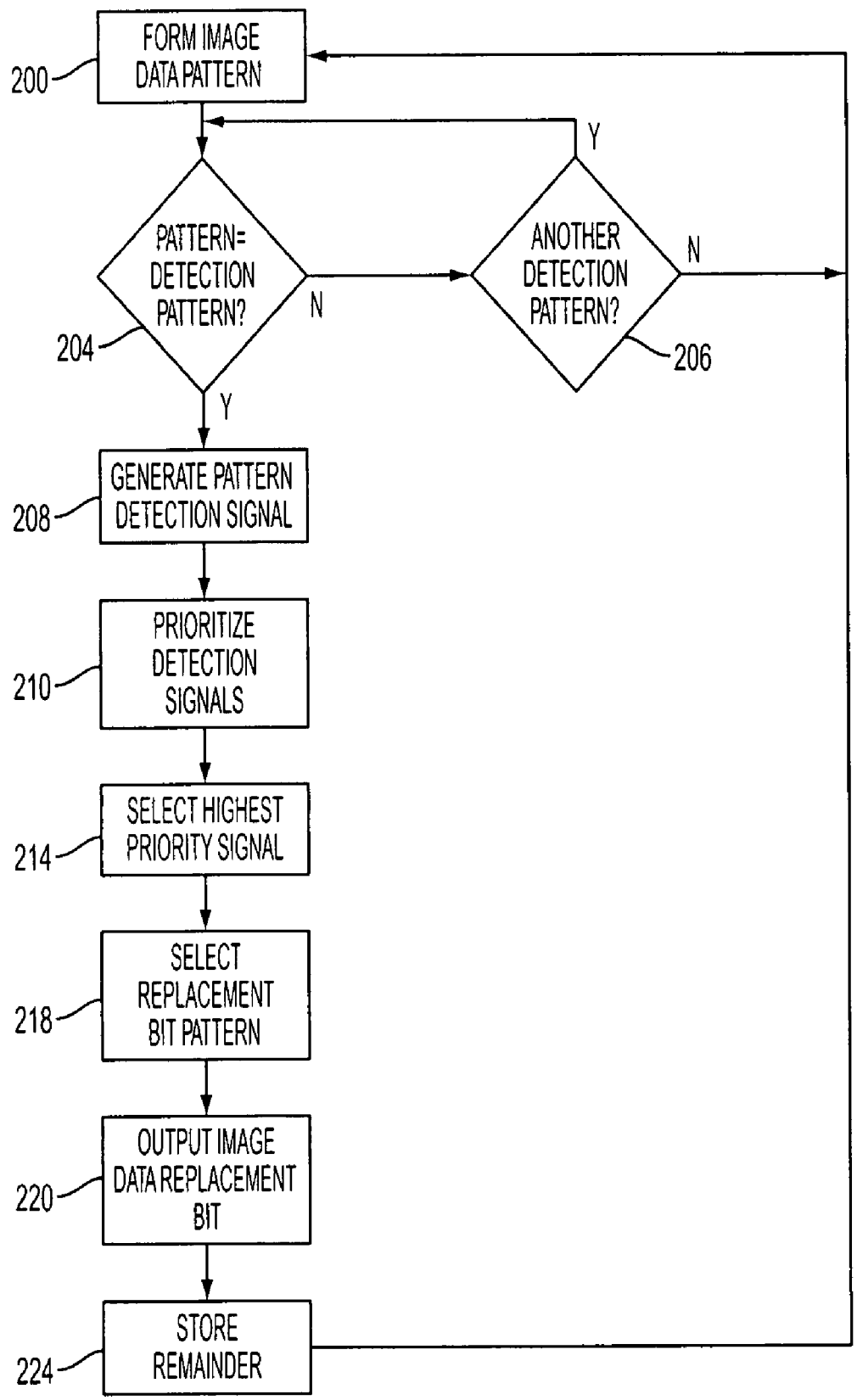
FIG. 4 is a flow diagram of a method for replacing problematic image data patterns with replacement bit patterns that attenuate ink jet problems.

The system described above performs the method shown in FIG. 4. The method begins by forming an image data pattern (block 200). If the slow scan mode is active, the image data pattern is formed using an image word read from a scanline memory and an image data input bit. If the fast scan mode is active, the image data input bit is placed in the least significant bit position of the fast scan input register 106. The image data pattern is compared to one or more detection bit patterns (block 204). This comparison may be performed in a serial manner or parallel manner. The comparisons are made for all detection bit patterns for which comparisons are enabled (block 206). For the detection patterns that correspond to the image data pattern, a detection signal is generated (block 208). These signals are prioritized (block 210) and the highest priority detection signal is selected (block 214). The replacement bit pattern corresponding to the selected detection signal is selected and used to replace the image data pattern (block 218). The image replacement bit is then provided to the print head controller (block 220) and the remainder of the replacement bit pattern is stored in the scanline memory (block 224). The process then continues for the image data pattern being formed. This method may also be modified to disable comparisons for particular ones of the detection bit patterns or to incorporate don't care words in the comparisons.

As may be appreciated from the disclosure presented above, the system and method of compensating for the presence of image data in a data stream that causes an ink jet actuator to reproduce the image data inaccurately is flexible and expandable. Specifically, the programming of the detection registers with problematic data patterns along with the versatility of incorporating don't care conditions from the tag register enable the system and method to adapt to the electro-mechanical eccentricities and characteristics for different ink jet actuators without extensive redesign of the circuitry of the system. Thus, the system and method disclosed herein compensate for ink jet abnormalities in a relatively economical and efficient manner.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A system for replacing bit pattern data in a stream of image bits used to drive a print head in an ink jet printer comprising:
    an image data pattern detection circuit having a plurality of comparators each comparator being configured to compare a portion of an image data bit stream used to drive a print head in an ink jet printer to a detection pattern in a plurality of detection bit patterns to enable the image data pattern detection circuit to detect at least one of the detection bit patterns in the image data bit stream and to generate a bit pattern detection signal in response to one of the comparators detecting one of the detection bit patterns in the portion of the image data bit stream compared to the detection bit patterns;
    a replacement bit pattern circuit being configured to select a replacement bit pattern from a plurality of replacement bit patterns in response to one of the comparators detecting one of the detection patterns, the selected replacement pattern being selected to replace the portion of the image data bit stream corresponding to the detected detection bit pattern and the replacement bit pattern being different than the detected bit pattern; and
    a tag register coupled to the image data pattern detection circuit and being configured to modify the comparison of the portion of the image data bit stream to one of the detection bit patterns.

2. The system of claim 1 further comprising:
    a priority encoder circuit coupled to the plurality of comparators and to the replacement bit pattern circuit, the priority encoder being configured to receive bit pattern detection signals from the plurality of comparators and to select one of the bit pattern detection signals for the replacement bit pattern circuit.

3. The system of claim 2, the tag register being further configured to incorporate a don't care word in at least one comparison performed by the plurality of comparators so the comparator does not compare the detection bit pattern to all data bits in the portion of the image data bit stream being compared to the detection bit pattern.

4. The system of claim 3 wherein the tag register is coupled to the replacement bit pattern circuit to modify the selected replacement bit pattern before the replacement bit pattern replaces the detected image data pattern in the image data bit stream.

5. The system of claim 4, the tag register being further configured to incorporate a don't care word in at least one replacement bit pattern before the replacement bit pattern replaces the portion of the image data bit stream that corresponds to a detection bit pattern.

6. The system of claim 5 further comprising:
a comparison control circuit being configured to generate a comparison control signal that corresponds to one of the detection bit patterns; and
one of the comparators in the plurality of comparators being coupled to the comparison control circuit so the comparator is disabled from comparing the one detection bit pattern to the portion of the image data bit stream in response to the comparison control signal being active.

7. A method for replacing bit pattern data in a stream of image bits used to drive a print head in an ink jet printer comprising:
comparing a plurality of detection bit patterns to a portion of an image data bit stream used to drive a print head in an ink jet printer;
generating a bit pattern detection signal in response to the portion of the image data bit stream corresponding to one of the detection bit patterns;
replacing the portion of the image data bit stream that corresponds to the detection bit pattern with one replacement bit pattern selected from a plurality of replacement bit patterns in response to the portion of the image data bit stream corresponding to one of the detection bit patterns, the selected replacement bit pattern being different than the detected bit pattern; and
selectively modifying the detection bit pattern before comparing the detection bit pattern to the portion of the image data bit stream.

8. The method of claim 7, the image data pattern detection further comprising:
generating a bit pattern detection signal for each detection data pattern to which a portion of the image data bit stream corresponds.

9. The method of claim 8 further comprising:
selecting the replacement bit pattern that corresponds to one of the bit pattern detection signals.

10. The method of claim 9 further comprising:
selectively modifying one of the detection bit patterns with a don't care word.

11. The method of claim 10, the replacement of the portion of the image data bit stream further comprising:
selectively modifying the replacement bit pattern with a don't care word before replacing the portion of the image data bit stream.

12. The method of claim 8 further comprising:
disabling at least one of the comparisons of the portion of the image data bit stream to the plurality of detection bit patterns to reduce a level of so the power consumed by performing the comparisons is reduced.

13. A system for replacing bit pattern data in a stream of image bits used to drive a print head in an ink jet printer comprising:
a scanline memory for storing image data;
an input data register for forming an image data pattern from image data read from the scanline memory and an image bit received from an image data stream;
an image data pattern detection circuit having a comparator that is configured to compare a portion of an image data bit stream used to drive a print head in an ink jet printer to a plurality of detection bit patterns and to generate a bit pattern detection signal in response to the portion of the image data bit pattern corresponding to one of the detection bit patterns;
a replacement bit pattern circuit being configured to replace the portion of the image data bit stream corresponding to one of the detection bit patterns with a replacement bit pattern, the replacement bit pattern being different than the detected bit pattern;
a tag register coupled to the image data pattern detection circuit and being configured to modify the comparison of the portion of the image data bit stream to one of the detection bit patterns, and
an output data register for providing a replacement image bit from the replacement bit pattern to a print head controller and for storing a remainder of the replacement bit pattern to the scanline memory.

14. The system of claim 13, the image data pattern detection circuit being configured to generate a bit pattern detection signal for each detection bit pattern corresponding to the portion of the image data bit stream pattern compared to the detection bit patterns; and
a priority encoder for selecting one of the bit pattern detection signals and for providing the selected bit pattern detection signal to the replacement bit pattern circuit for selection of the replacement bit pattern.

15. The system of claim 14 further comprising:
a comparison modification circuit being configured to modify a comparison of the portion of the image data bit stream to a detection bit pattern.

16. The system of claim 15, the comparison modification circuit being further configured to incorporate a don't care word in the comparison of the image data pattern to the detection bit pattern.

17. The system of claim 16, the output data register being further configured to incorporate a don't care word with the replacement bit pattern and the image data pattern to form an output image word before providing the replacement image data bit from the output image word and storing the remainder of the output image word to the scanline memory.

* * * * *